(12) United States Patent
Dowla et al.

(10) Patent No.: US 11,387,864 B2
(45) Date of Patent: Jul. 12, 2022

(54) PULSE BASED WIDEBAND SIGNALING

(71) Applicants: Farid Dowla, Castro Valley, CA (US);
Faranak Nekoogar, San Ramon, CA
(US); David Benzel, Gilmer, TX (US)

(72) Inventors: Farid Dowla, Castro Valley, CA (US);
Faranak Nekoogar, San Ramon, CA
(US); David Benzel, Gilmer, TX (US)

( * ) Notice: Subject to any disclaimer, the term of this patent is extended or adjusted under 35 U.S.C. 154(b) by 0 days.

(21) Appl. No.: 16/891,760

(22) Filed: Jun. 3, 2020

(65) Prior Publication Data
US 2020/0389206 A1 Dec. 10, 2020

Related U.S. Application Data

(60) Provisional application No. 62/857,790, filed on Jun. 5, 2019.

(51) Int. Cl.
| | |
|---|---|
| *H04B 1/717* | (2011.01) |
| *H04B 1/7163* | (2011.01) |
| *H04B 1/7176* | (2011.01) |
| *H04B 1/719* | (2011.01) |

(52) U.S. Cl.
CPC ......... *H04B 1/7174* (2013.01); *H04B 1/7172* (2013.01); *H04B 1/7176* (2013.01); *H04B 1/71635* (2013.01); *H04B 1/71637* (2013.01); *H04B 1/719* (2013.01)

(58) Field of Classification Search
CPC .............. H04B 1/7174; H04B 1/71635; H04B 1/71637; H04B 1/7172; H04B 1/7176; H04B 1/719; H04J 13/0003
See application file for complete search history.

(56) References Cited

U.S. PATENT DOCUMENTS

| | | | | |
|---|---|---|---|---|
| 5,128,677 A | * | 7/1992 | Donovan ............... | G06F 13/385 340/12.18 |
| 2002/0080889 A1 | * | 6/2002 | Dress, Jr. ............. | H04B 1/7174 375/295 |
| 2004/0017840 A1 | * | 1/2004 | Siwiak ............... | H04B 1/71632 375/146 |
| 2005/0238113 A1 | * | 10/2005 | Santhoff ............. | H04L 27/0008 375/295 |
| 2006/0193372 A1 | * | 8/2006 | McCorkle ............ | H04B 1/7172 375/130 |
| 2016/0036393 A1 | * | 2/2016 | Lin ........................ | H03F 3/19 330/295 |

* cited by examiner

*Primary Examiner* — Sam K Ahn
*Assistant Examiner* — Amneet Singh
(74) *Attorney, Agent, or Firm* — Scott Lefton

(57) ABSTRACT

A system for pulse based wideband signaling comprises a transmitter that performs physical layer encoding of both digital and analog data into a pulse repetition rate signal, and modulation of the pulse repetition rate signal into wideband radio frequency pulses, and transmission of the pulses as a wideband RF signal, a receiver that performs physical layer demodulation of the wideband RF signal into a pulse repetition rate signal, and decoding of the pulse repetition rate signal into digital and analog data, wherein the system provides improvement in controlling and balancing the variables of bandwidth, signal to noise ratio, range, and power consumption.

28 Claims, 11 Drawing Sheets

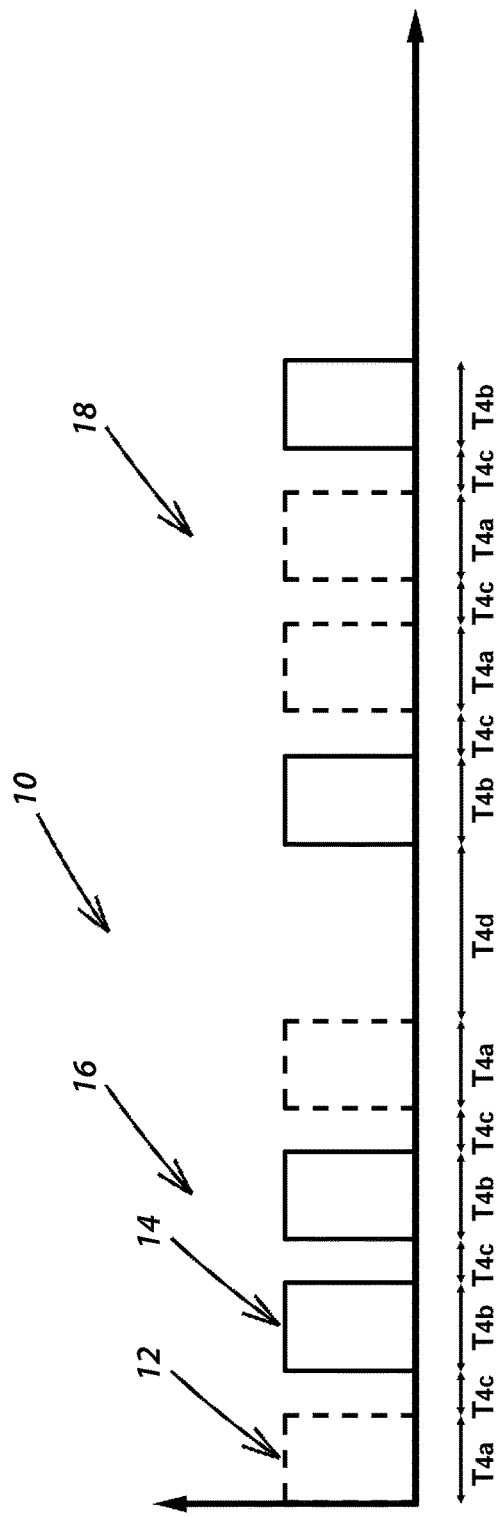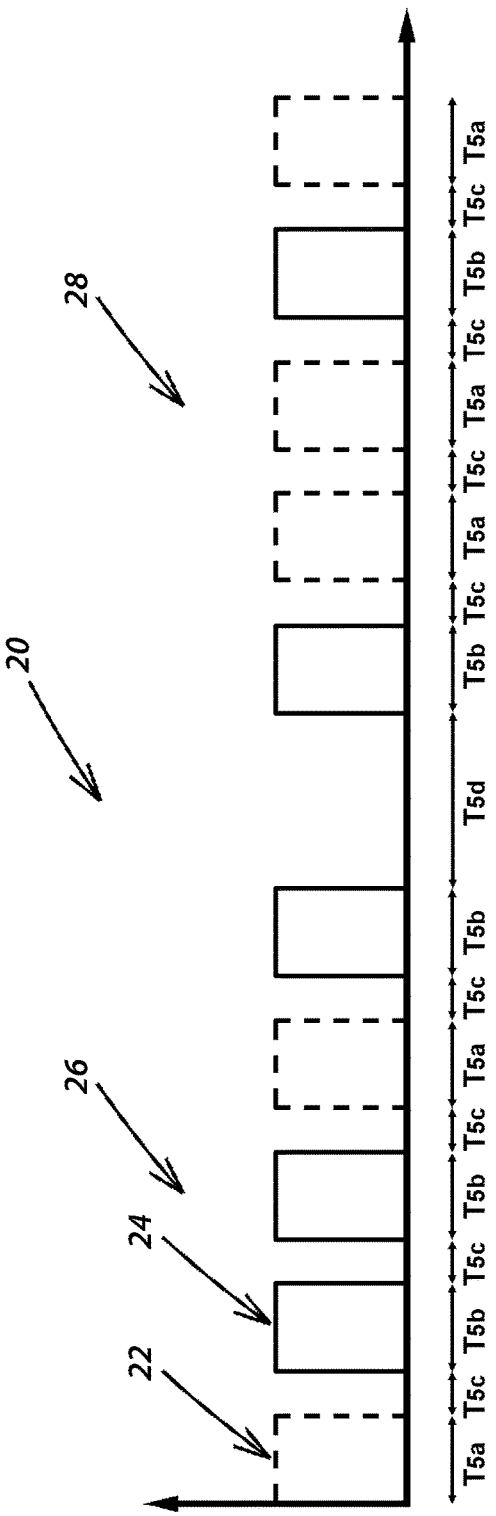

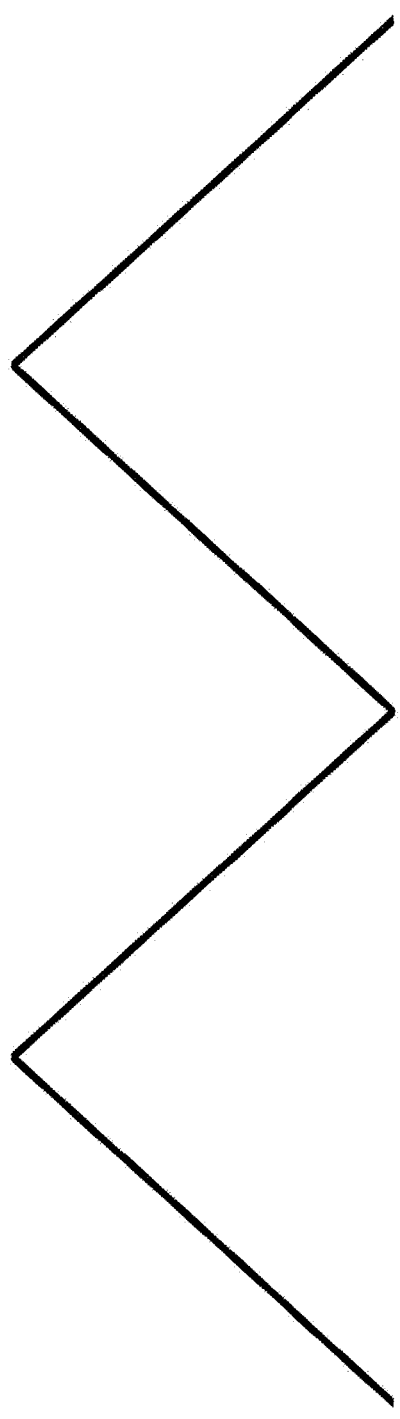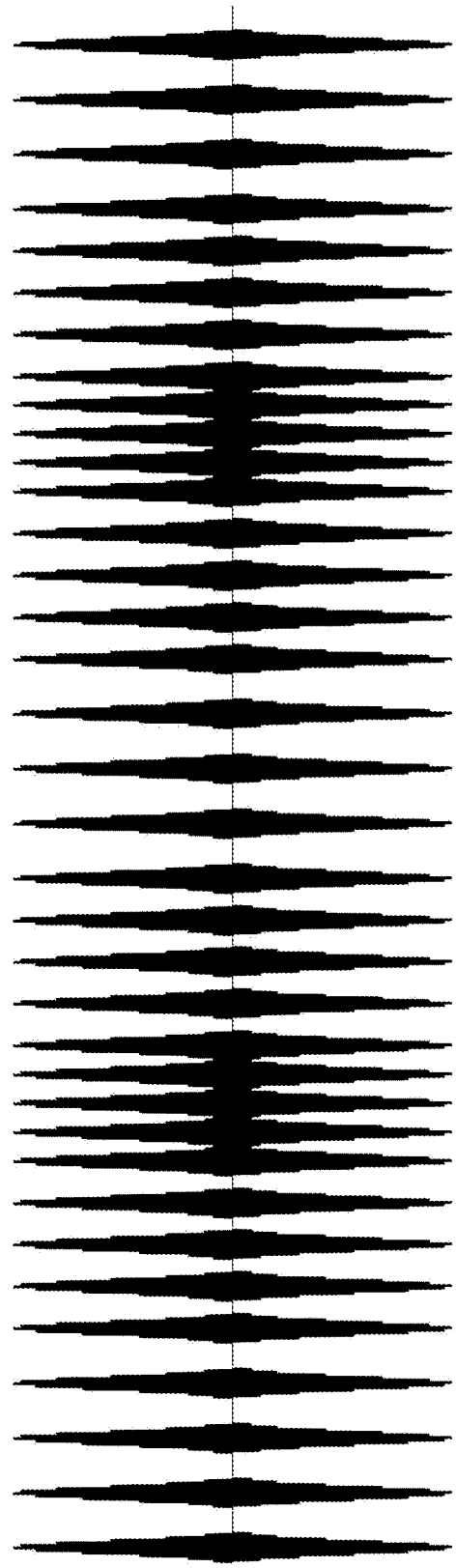
Fig. 6

PULSE BASED WIDEBAND SIGNALING

RELATED APPLICATIONS

This patent application claims the benefit under 35 USC 119(e) of U.S. Provisional Patent Application No. 62/857,790 filed on Jun. 5, 2019 and entitled "Pulse Based Wideband Signaling", the entirety of which is incorporated herein by reference.

FIELD OF THE INVENTION

This invention hand wireless communications a 1 more particularly communication systems using pulse based transmitting and receiving of signals.

BACKGROUND OF THE INVENTION

In ultra wideband (UWB) communications systems, information is transmitted and received over wide bandwidths, typically greater than 500 MHz or 20% of the arithmetic center frequency (such as 200 MHz of 1 GHz), in a way that minimizes interference with conventional narrowband and wideband communications systems, while sharing the same spectrum among many users. Once known as pulse radios, UWB is a radio technology that can use short pulses at a very low energy level for short-range, high-bandwidth communications over a large portion of the radio spectrum.

In contrast to conventional communications systems which transmit information by varying a sinusoidal signal's amplitude (amplitude modulation), frequency (frequency modulation), or phase (phase modulation), UWB pulses occupy a wide bandwidth by using the timing of the pulses to transfer large amounts of information, although by also occupying a large bandwidth for those short durations.

Some UWB communications systems are designed to transfer information by encoding the polarity of a pulse, by changing its amplitude, or even by using orthogonal pulses. Other UWB systems are designed to send pulses sporadically, while still others transmit pulses continuously, at pulse rates exceeding 1 Gpulses/s for high-capacity (high data rate) transmissions.

Low-cost Digital Signal Processing (DSP) hardware is often used in modern digital radios to generate several modulation methods. These systems can step down the information density in their signal to serve users at greater distances (increased range). An advantage of UWB is that even simple implementations can provide this adaptation. For example, as the range increases, a UWB radio can use several pulses to send one information bit thereby increasing the Signal-to-Noise Ratio (SNR) in the receiver. Since the average power consumption of a UWB transmitter grows linearly with Pulse Repetition Frequency (PRF), it is easy to envision a relatively simple UWB radio that, under software control, can dynamically trade data rate, power consumption, and range.

In contrast to narrowband channels, where the amount of noise within the channel is limited by effective filtering to suppress any noise and interference outside of the frequency band in use, wideband channels can limit the noise appearing at frequencies outside of the channel. However, any signals that are transmitted within the band must compete with the noise floor of that section of spectrum.

Wideband channels can carry more information than narrowband channels. Narrowband channels typically carry much less information than wideband channels and operate over shorter distances between transmitter and receiver. But because narrowband channels have less noise and typically lower noise floors (depending upon the channel bandwidth) than wideband channels, they typically require lower transmit power levels than communications systems with wideband channels and can typically operate with lower wattage transmitter and receiver power supplies than communications equipment with wideband channels at nearby frequencies.

The low operating-power requirements of narrowband communications equipment often makes it the preferred solution for applications that require transmission of limited information over relatively short distances, but may require operation by means of battery power, such as in a portable and/or mobile electronic device.

UWB communications systems favor high pulse repetition rates (typically in the range of one to two gigapulses per second), thus enabling short-range gigabit-per-second communications systems. Each pulse in a pulse-based UWB system occupies the entire UWB bandwidth. This allows UWB to reap the benefits of relative immunity to multipath fading, unlike carrier-based systems which are subject to both deep fading and intersymbol interference (ISI). However, both UWB and carrier-based systems are susceptible to ISI, which is a form of distortion of a signal in which one symbol interferes with subsequent symbols. This is an unwanted phenomenon as the previous symbols have similar effect as noise, thus making the communication less reliable. The spreading of the pulse beyond its allotted time interval causes it to interfere with neighboring pulses. ISI is usually caused by multipath propagation or the inherent linear or non-linear frequency response of a communication channel causing successive symbols to "blur" together.

Conventional wideband communication systems are based on continuous narrowband signals often coded as code division multiple access (CDMA) or frequency division multiple access (FDMA). Although these systems are wideband, the fundamental building block for their communications is based on narrowband signals, and can suffer from multipath degradation, fading, and other liabilities. CDMA, particularly asynchronous CDMA, is a major technology used in cellphone communications, but requires continuous carrier frequencies and very precise phase locked loops (PLLs) in order to synchronize signals between handsets and cell towers. Conventional wideband communication systems such as cellphone systems are also optimized for simultaneous use by large numbers of different users.

In contrast to wideband communication technologies that use continuous signals, pulse based wideband communications systems use short duration pulses that naturally generate a wide bandwidth and are more resilient to multiparty effect and jamming. Pulse based wideband signals can offer the advantages of UWB communications with less limitation in power spectral density. In general, wideband pulses are defined as having a fractional bandwidth less than 20%.

Historically, a radio communication system transmitting both digital and analog data would have separate processing paths for digital and analog signals, thus increasing circuit complexity and power consumption.

Accordingly, it would be advantageous to have a radio system that provides a compact, low power, and portable communications system for transmitting and receiving both digital and analog signals, including audio and video, streaming video, and encrypted data, useful for defense, homeland security, and other national security as well as commercial applications, with robust and flexible control of tradeoffs between data rate, signal to noise ratio, range, and power consumption.

Other aspects and features of the present invention will become apparent to those ordinarily skilled in the art upon review of the following description of specific embodiments of the invention in conjunction with the accompanying figures.

SUMMARY

It is an object of the present invention to provide a radio system that provides a compact, low power, and portable communications system for transmitting and receiving both digital and analog signals, with robust and flexible control of tradeoffs between bandwidth, signal to noise ratio, range, and power consumption.

In accordance with an embodiment of the invention there is provided a system for pulse based wideband signaling comprising: a transmitter comprising a data encoder, a wideband modulator, a power amplifier, and a first antenna; a set of specific pulse sequences with which each bit of data is encoded, thereby providing a pulse repetition rate; a specific carrier frequency and bandwidth with which the pulse repetition rate is modulated into wideband modulated pulses; a receiver comprising a second antenna, a baseband conversion stage, an RF detector, a demodulator, and a decoder; and the pulse repetition rate demodulated from the wideband modulated pulses, the pulse repetition rate then decoded and output as bits of data.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1 depicts 4-pulse sequences comprising bits of digital data.

FIG. 2 depicts 5-pulse sequences comprising bits of digital data.

FIG. 6 depicts a sawtooth analog waveform and a corresponding wideband modulated pulse sequence.

DESCRIPTION OF THE PREFERRED EMBODIMENTS

Figure 3:
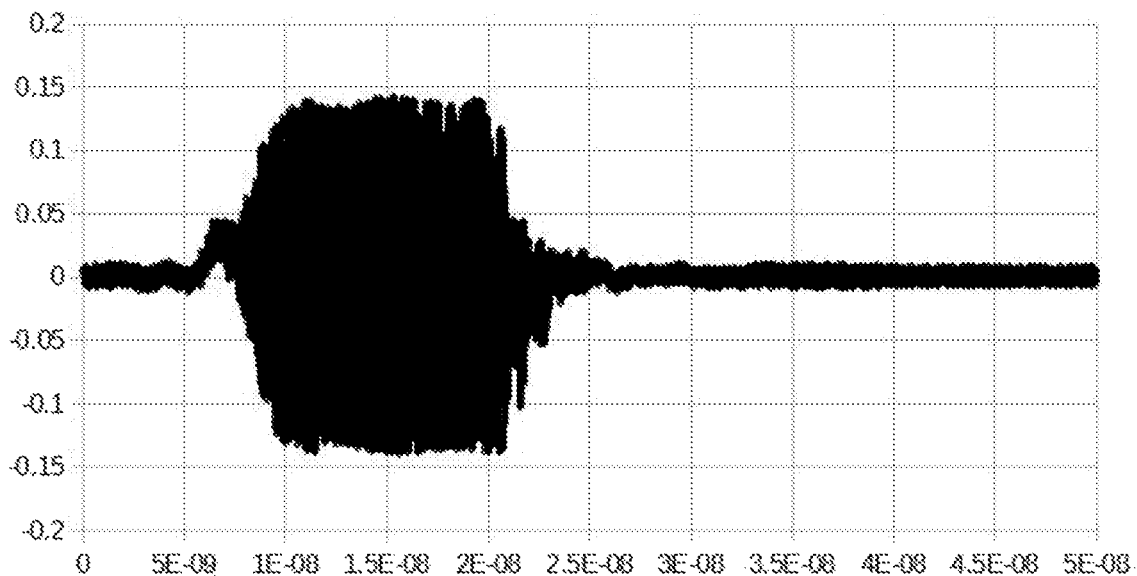
FIG. 3 depicts a 5.6 GHz, 10 nsec wideband pulse.

The present invention is directed to wideband wireless communications, and more particularly communication systems using pulse based transmitting and receiving of signals.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

The pulse based wideband signaling (PBWS) system as disclosed herein is intended to provide a compact, low power, and portable communications method and system for transmitting and receiving digital and analog signals, including audio and video, including streaming video, and optionally including encrypted data, over a range of distances and in environments that include significant radio interference and physical barriers. These signals are transmitted and received by the PBWS as encoded short radio frequency (RF) pulses, what are generally defined as ultra wideband/ wideband (UWB/WB) RF pulses. Generally, these RF pulses have bandwidths of at least 200 MHz. The PBWS is a novel radio that is highly reliable, being robust against multipath, interference, and noise effects. The UWB/WB radio design is useful for defense, homeland security, and other national security as well as commercial applications. The challenges to be overcome with a flexible and robust communications method and system include the basic physics of RF transmission and the tradeoffs inherent in RF modulation schemes.

The PBWS invention disclosed herein is neither a conventional UWB nor a conventional narrowband or wideband RF design. Narrowband communications channels have long been used in many applications that have depended upon achieving reliable links in different operating environments, including applications such as tactical military radios and industrial monitoring systems. But as more information must be conveyed between two points by wireless means, such as for video streaming and advanced surveillance systems, higher bandwidth communications channels with their greater data capacities become more attractive; i.e. bandwidth is employed primarily to increase the data capacity. An important objective of this invention, on the contrary, is to increase both the reliability and robustness of the wireless link, as well as the effective data capacity.

Compared to WB pulsed RF systems, narrowband signals occupy much less frequency spectrum and employ higher transmit power in that narrow frequency band. Pulsed UWB and WB signals employ short pulses that send information while briefly occupying a large portion of the traditional communications frequency spectrum. However, the modulation techniques ultimately define the performance of all these techniques. The present invention includes novel modulation methods that can be employed for wideband signals, and the method can be employed at any band. This is significant as higher RF frequency bands (from microwave, to millimeter, to hundreds of GHz) are becoming the next frontier of RF communication systems. The present invention preferably applies to higher frequencies, as wideband pulses are critical at the higher frequencies.

Applications for this invention include voice, data, (including sensor, image, and video data) and communications in harsh RF propagation environments such as high EMI environments, and from heavy metallic structures including near faraday cage communications such as metallic containers with small openings, inside aircraft to inside/outside communications, and through the wall communications including through rebar reinforced concrete walls in nuclear facilities.

The PBWS system includes a novel physical layer design for robust and high-bandwidth (e.g. video) applications. One preferred center frequency is 5.6 GHz, although the system can also work at lower or higher frequencies, with successful operation having also been demonstrated at 300 MHz, 450 MHz, and 915 MHz. The main difference between the system realizations at the different frequencies is in the pulse generating circuitry. In fact, the PBWS modulation scheme can be designed to work for any center frequency, provided that there is pulse generating circuitry that can provide sufficiently short pulses. Assuming the availability of suitable hardware, the PBWS system could work in the Terahertz frequency range too. The power level is adjustable for desired range. The data bandwidth is also adjustable for the application, where a typical bandwidth range can be for example 100 MHz to 300 MHz. All these flexibilities come due to pulse-based RF design.

The PBWS communication range can vary dependent on the size of the antennas, power of the transmitters, and sensitivity levels of the receiver. The range can preferably vary from 1 km to 10 meters, dictated primarily by the specifications of use case constraints.

In one example, the PBWS as implemented with small 3 dB gain stub antennas and the receiver sensitivity was set at −70 dBm, and transmitter average power levels were set at around 100 milliwatts, to get a range of about 500 meters. All these parameters can be set to levels dictated by regulatory agencies and application needs. The PBWS design also allows software and/or firmware control of the parameters for data rate and transmitter power levels.

The data baud rate can vary, but implanted (embedded) radios have been designed at 1 Mbps, but the basic design can be implemented for both higher and lower data rates. The design can be implemented on dedicated hardware platforms and/or software defined radio (SDR) platforms. SDR implementation allows for on-the-fly changing parameters for multi-channel selection, full duplex, simplex operations.

The novel modulation scheme employed by the PBWS system and method includes physical layer encoding of each binary "0" and "1" as a selected plurality of modulated pulses, wherein each modulated pulse may be referred to as a "chip". In general, the word "pulse" is intended to mean each discrete portion of a sequence of encoded data, the sequence thus representing a single "0" or "1", and the word "chip" is intended to mean each pulse that has been modulated with RF to contain a plurality of spectral components. The preferred number of pulses per bit is in the range of 4 to 5 in the current implementation. This is a preferred numerical range of pulses in order to simultaneously realize significant processing gain; in the current implementation as much as 6 dB, along with a highly reliable capacity, expressed as effective bits per second, (BPS) while realizing the system using commercially available hardware. An informal lower bound on acceptable BPS is streaming standard quality video to a handheld mobile device. With a center frequency of 5.6 GHz, the preferred PBWS system can provide 1 mega-bit per second (MBPS) in a wideband modulated sequence of pulses. The center frequency of 5.6 GHz is arbitrary; any appropriate center frequency may be used. A system capable of transmitting, receiving, and processing a higher center frequency plus a shorter pulse period and more closely spaced pulses, would allow the same data rate with a higher number of pulses per bit. Increasing the number of pulses per bit while holding other parameters constant would increase the processing gain, though at the expense of effective data rate.

The key innovation of the technique described here is a modulation scheme that incorporates both physical layer waveform coding and data encoding. Note that waveform coding and modulation technique are not defined by standards such as UWB. The waveform coding and modulation of the present invention have been realized on wideband pulses; the method of the present invention can also be used to modulate other UWB or narrowband pulses.

The modulation method of the present invention also has the advantage of being asynchronous and not requiring any continuous carrier frequency, thus allowing implementation in multiple applications, including ISM, military communications, and other civilian communication applications. This is unlike spread spectrum standards such as DSSS, CDMA, LTE, besides AM and FM techniques. In comparison to conventional methods, the PBWS method has the advantages of not requiring high accuracy clocks for transceiver synchronization.

The modulation method of the present invention is universal in the sense that it can be scaled to any bandwidth and any center frequency. The present invention is able to perform waveform coding and data modulation in a seamless fashion using RF circuitry to achieve improved performance resilience and data bandwidth.

In other embodiments of the present invention, the pulse coding method is used to modulate one or more variables such as pulse shape, pulse repetition frequency, pulse polarity, and the amount of delay between pulses. This pulse coding method thus provides many degrees of freedom to modulate combinations of these variables and thus make the pulse based system output look like noise to any unintended receiver. Only the intended receiver that is aware of the pulse coding method and the selected pulse sequences that encode data can decode the signal.

The PBWS encoding and modulating of data can be considered to be a true discrete time modulation technique most naturally suited for pulsed based systems. In the present invention, modulation of the pulse repetition rate (PRR) is controlled by the baseband information that is being transmitted. The method has been implemented for both digital and analog signals.

One of the most unique features of the PBWS radio design is that the PRR (or REP signal) signaling can easily accommodate both digital and analog communications. In other words, the input signal to be transmitted can be either analog waveforms or digital data including speech vocoder data or video streaming data. In the preferred embodiment of the present invention a control input, for example a signal from an embedded processor, selects a proper input channel using one or more multiplexers. Using multiplexers, the system can accommodate multiple analog and digital inputs. (Alternatively, a plurality of transmitters and receivers can be used in order to realize simultaneous transmission of multiple sequences of data.) The signal is passed through a low pass filter to smooth out the signal to a voltage controlled oscillator (VCO). The voltage of the incoming signal works as a control voltage and determines the frequency and/or phase of the oscillator. In the preferred embodiment for digital input data, a low voltage output frequency or first specific phase shift represents a logic "0" and a high voltage output frequency or second specific phase shift represents a logic "1". (The inverse of this representation is equally valid within the scope of the invention, as long as the representation is consistent throughout.) This is called the REP signal. In the preferred embodiment for analog signals, the REP signal can vary over a range.

In its digital form, the PRR takes two distinct rates, one for "0" and one for "1". In its analog form, the PRR is controlled by the amplitude of the signal through use of a VCO. The analog form of the PRR is thus a sequence of wideband pulses generated in response to an input signal of time-varying amplitude, wherein each wideband pulse is a pulse that has been modulated with RF to contain a plurality of spectral components. There is a variable time spacing between each pulse in the sequence of wideband pulses, and the variable time spacing between each pulse is a function of the amplitude of the input signal. Phase shift between the pulses can also be a function of the amplitude of the input signal, in addition to or instead of the variable time spacing. Thus for processing analog input data, neither pulse code modulation (PCM) nor an analog to digital converter (ADC) are required with the PBWS. This is significant because it greatly simplifies the circuitry required in order to realize the PBWS.

FIG. 1 shows examples of 4 pulse sequences encoding "1" and "0" data. The 4-pulse coded data 10 is encoded in sequences of 4 pulses or chips, comprising individual "type a4" chips 12 and "type b4" chips 14. The duration of the "type a4" chip is shown as T4a and the duration of the "type b4" chip is shown as T4b. The time spacing between chips is T4c, and the time spacing between the first 4-coded bit of data 16 and the second 4-coded bit of data 18 is T4d.

If the pattern of chips forming the first 4-coded bit of data 16 represents "1" then the orthogonal pattern of chips forming the second 4-coded bit of data 18 must represent "0". Any pattern of chips may be defined to represent either a "1" or "0" bit of data; orthogonal patterns provide the highest signal to noise ratio, but are not essential to the function of the invention, as long as distinctly different patterns or sequences of chips are used. For physical layer encryption and multichannel communications, both orthogonal and non-orthogonal patterns or sequences of chips may be used too.

Likewise, FIG. 2 shows examples of 5 pulse sequences encoding "1" and "0" data. The 5-pulse coded data 20 is encoded in sequences of 5 pulses or chips, comprising individual "type a5" chips 22 and "type b5" chips 24. The duration of the "type a5" chip is shown as T5a and the duration of the "type b5" chip is shown as T5b. The time spacing between chips is T5c, and the time spacing between the first 5-coded bit of data 26 and the second 5-coded bit of data 28 is T5d.

If the pattern of chips forming the first 5-coded bit of data 26 represents "1" then the orthogonal pattern of chips forming the second 5-coded bit of data 28 must represent "0". As with the 4 pulse sequences, any pattern of chips may be defined to represent either a "1" or "0" bit of data; orthogonal patterns are desirable but not essential.

Figure 4:
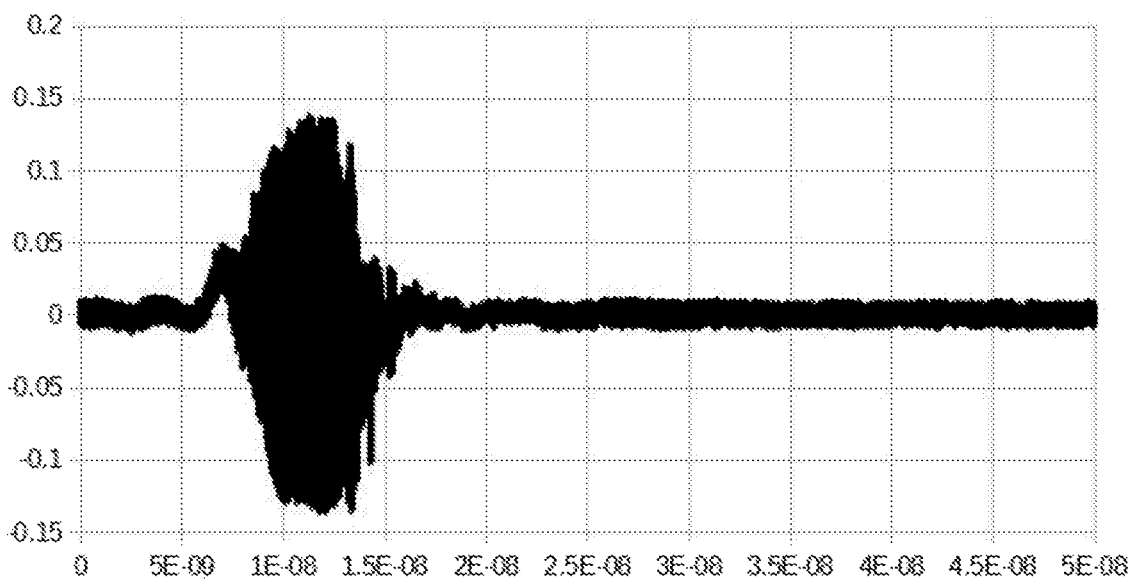
FIG. 4 depicts a 5.6 GHz, 3 nsec wideband pulse.

These chips may be any type of pulse signal, as long as they are clearly differentiated from each other. This differentiation may be realized by time duration for each type of chip, or by altering the PRR. Increasing the number of chips per bit of data will increase processing gain, but will decrease data bandwidth for a selected center frequency, pulse period, and pulse spacing. This is a fundamental tradeoff inherent to the PBWS. The preferred number of chips per bit in the PBWS system is in the range of 4 to 5, although more or fewer chips per bit can be used within the scope of the invention. It is within the scope of the invention to have a bandwidth control circuit in both the transmitter and the receiver, providing control over the number of encoded and decoded chips per bit. These bandwidth control circuits would have to be using the same number of chips per bit in order to correctly decode the encoded data. FIG. 3 shows a 10 ns wideband pulse, and FIG. 4 shows a 3 ns wideband pulse. In one preferred example, the 10 ns pulse could represent a "type a" chip and the 3 ns pulse could represent a "type b" chip. However, it would be equally valid to have the 3 ns pulse represent a "type a" chip and the 10 ns pulse represent a "type b" chip, as long as the defining convention was maintained consistently between the transmitters and receivers.

Figure 5:
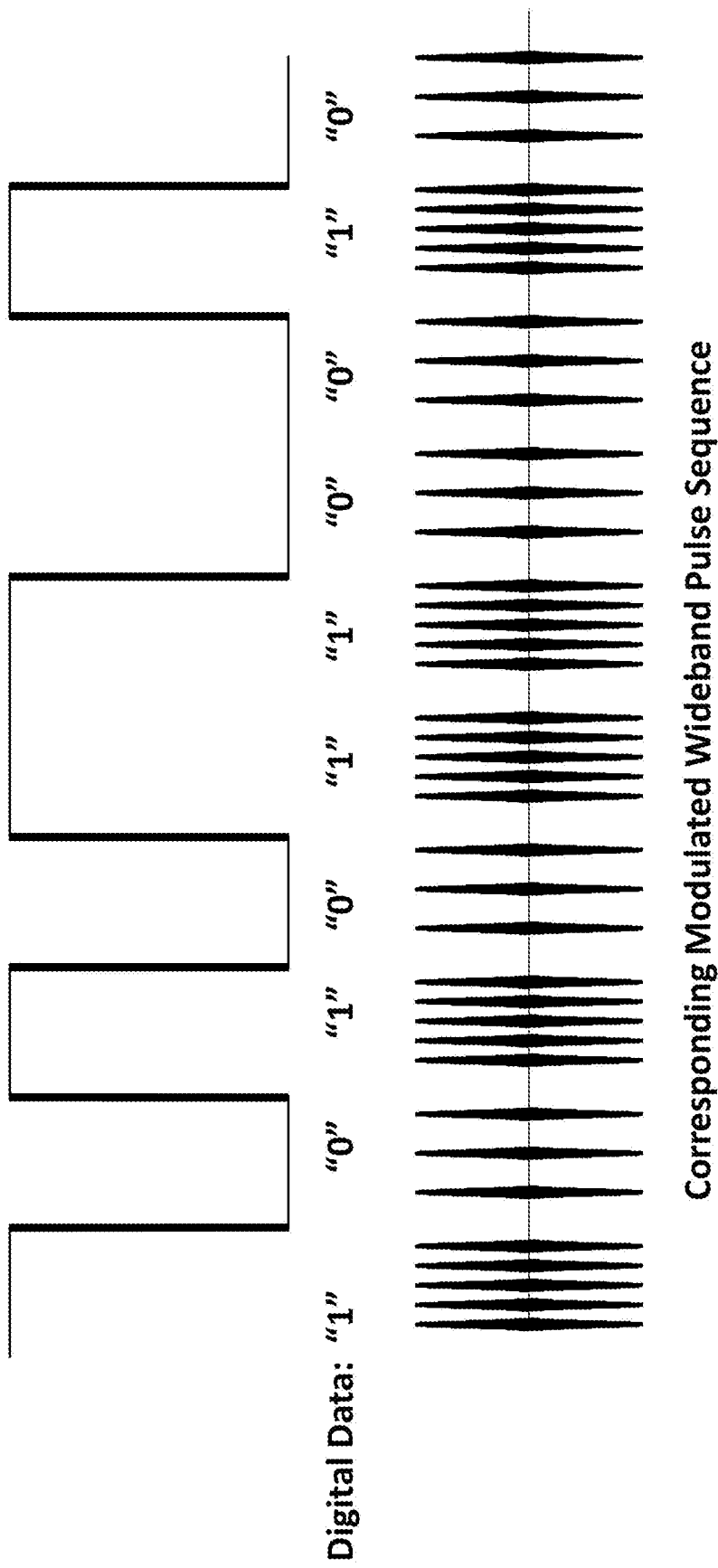
FIG. 5 depicts digital data and a corresponding wideband modulated pulse sequence.

FIG. 5 shows PRR modulation of a wideband signal with a digital data input. The corresponding modulated wideband pulse sequence is seen to be the patterns of chips encoding the "0" and "1" data. In this particular case the patterns of chips encoding the "0" and "1" data are not orthogonal, but they are distinctly different in pattern and spacing.

Thus, the RF pulse is both wideband and coded, wherein the coded nature of the PBWS RF pulse also provides both physical layer encryption and noise/interference suppression. It is required for any receiver to know the pulse code patterns in order to receive a transmission and preferably to perform error detection and correction upon it. Error detection and correction schemes may be Hamming coding, block coding, convolution coding, or any other error detection and correction scheme known to those skilled in the art. Error detection and correction can preferably be implemented by use of forward error correction (FEC), either before data is input to the PBWS system, or may be incorporated into or before the pulse coding portion of the system. This is in addition to any computationally based encryption scheme, wherein any such software based encryption scheme may also be used with the system. Such encryption schemes may be implemented before data is input to the PBWS system, or may be incorporated into or before the pulse coding portion of the system. The implementation of standard error detection and correction techniques, and of standard encryption techniques, are well known to those skilled in the art.

As expected, the processing gain and signal to noise ratio increase with more chips or pulses per bit, but with the tradeoff of fewer bits per second (BPS) and thus lower data rate at a given center frequency. The PBWS system has a specific carrier frequency and bandwidth, wherein the constant bandwidth is directly related to the duration of the pulse. In the preferred realization with a center frequency of 5.6 GHz, the pulse repetition frequency (PRF) provides a BPS rate of approximately 1 MBPS, which allows reliably streaming video to small screens such as are found in tablets and other handheld devices. Since the PBWS system has no phase dependency, it can operate in a completely asynchronous mode, not requiring any phase locked loop, and realizing lower power consumption.

The PBWS system is able to directly accept analog inputs such as audio signals. A VCO is used to convert analog inputs into a string of time-varying pulses which are used to modulate the PRR without requiring the use of PCM or an ADC. The ability of the PBWS system to accept both analog and digital data inputs is extremely powerful and versatile.

FIG. 6 shows PRR modulation of a wideband signal with a sawtooth analog waveform input. The corresponding modulated wideband pulse sequence is seen to be the pattern of chips representing the VCO output from the sawtooth input.

Depending on the data protocol selected, the PBWS may include start bits and stop bits for data transmission and receiving. A group of start bits may also be used to instruct a receiver as to whether the incoming data is analog data or digital data.

Figure 7:
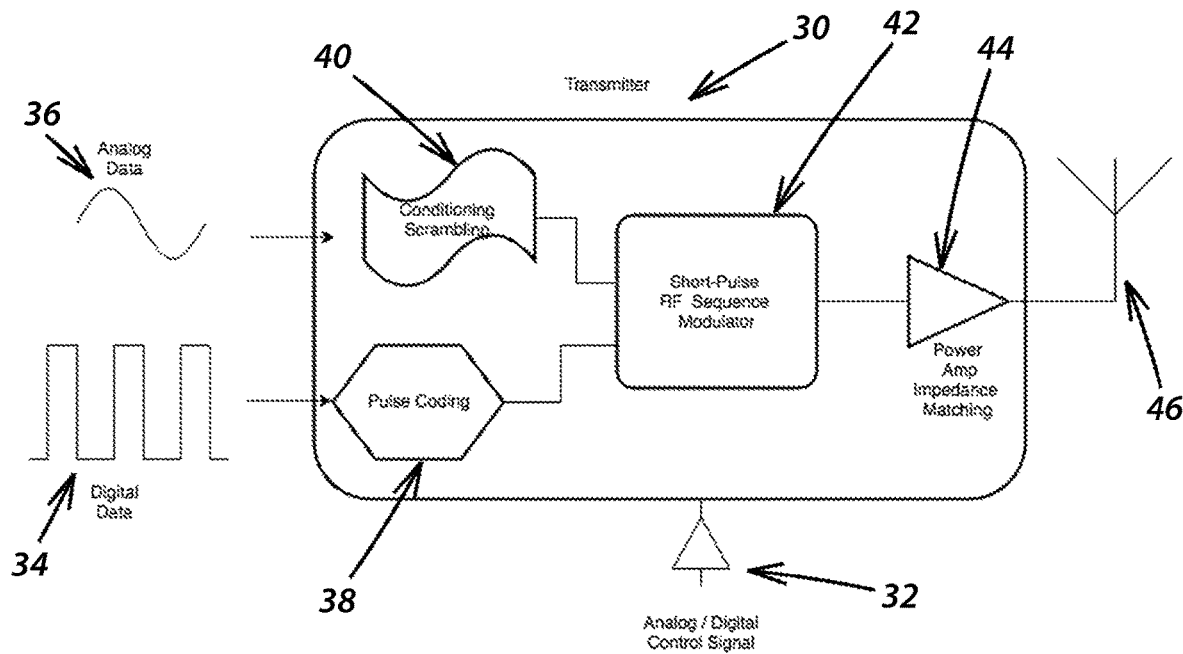
FIG. 7 depicts a block diagram of a pulse based wideband signaling transmitter.

FIG. 7 shows a simplified block diagram of a wideband Transmitter 30 for a typical PBWS system. An Analog/Digital control signal 32 is input to the Transmitter 30 to select whether analog or digital data is being modulated. Digital data 34 is input to the Pulse Coding block 38, where each bit of data is encoded as a specific sequence of pulses. Analog signal data 36 is input to the Conditioning and Scrambling block 40, where the analog signal data 36 is processed into time-varying pulses by a VCO. The Conditioning and Scrambling block 40 may also perform functions including normalizing the signal dynamic range, and analog encryption via convolution/deconvolution schemes. Depending on the selection of the Analog/Digital control signal 32, either the digitally derived sequence of pulses or the analog derived time-varying pulses are then input to the Short-Pulse RF Sequence Modulator 42, wherein the pulses are modulated into chips. This modulation is preferably accomplished by using a pulse generator and a mixer, wherein the pulse generator PRR is controlled by the input data in the form of digital "0" and "1" bits, or the analog VCO output. The pulse generator and the PRR are entirely signal-dependent and thus the pulse generator has no need to run continuously, thereby also saving power. The chips sequence output of the Short-Pulse RF Sequence Modulator 42 is then input to the Power Amp and Impedance Matching block 44, where the chips sequence is amplified and impedance matched so that it can be transmitted as RF energy by the transmitter Antenna 46.

Figure 8:
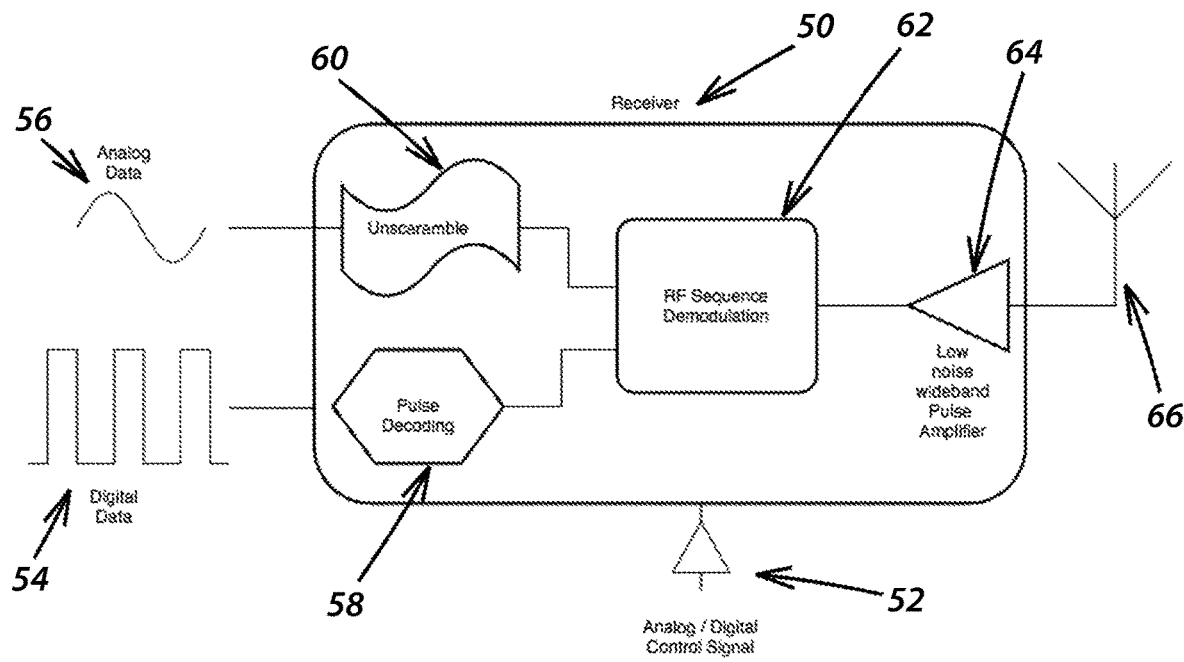
FIG. 8 depicts a block diagram of a pulse based wideband signaling receiver.

FIG. 8 shows a simplified block diagram of a wideband Receiver 50 for a typical PBWS system. An Analog/Digital control signal 52 is input to the Receiver 50 to select whether analog or digital data is being demodulated. RF energy is received by the Antenna 66 and input to a Low Noise Wideband Pulse Amplifier 64. The amplified signal is input to an RF Sequence Demodulator 62, which demodulates either an analog or a digital signal, depending on the selection made with the Analog/Digital control signal 52. The demodulation process may include but is not limited to the use of techniques such as bit slicing, rectification, low pass filtering, edge detection, and threshold detection. The demodulated digital data is input to the Pulse Decoding block 58, where each sequence of pulses is decoded into the "0" and "1" components of the original binary data, and output as digital data 54. The demodulated analog data (still in pulse form) is input to the Unscramble Block 60, wherein it is converted back into analog form preferably by a convolution/deconvolution filter, and output as analog signal data 56. Optionally, error detection and correction, as well as decryption, may be performed in the Pulse Decoding block 58, or may happen once digital data is output from the Receiver 50. Additionally, any patterns of chips received that are not encoded in the specific expected encoding pattern (but are also not seen to be codes that need to be error corrected) will be rejected as noise by the Receiver 50.

By using multiple PBWS channels, both digital and analog data may be transmitted and received simultaneously. Each of the PBWS Transmitter 30 and the Receiver 50 may be realized in a field programmable gate array (FPGA), which will substantially shrink the Transmitter 30 and Receiver 50 component form factors, and also provide reduced noise levels in both transmission and reception. The realization of the PBWS system in FPGAs is another example of the benefits of the physical layer nature of the present invention.

Figure 9:
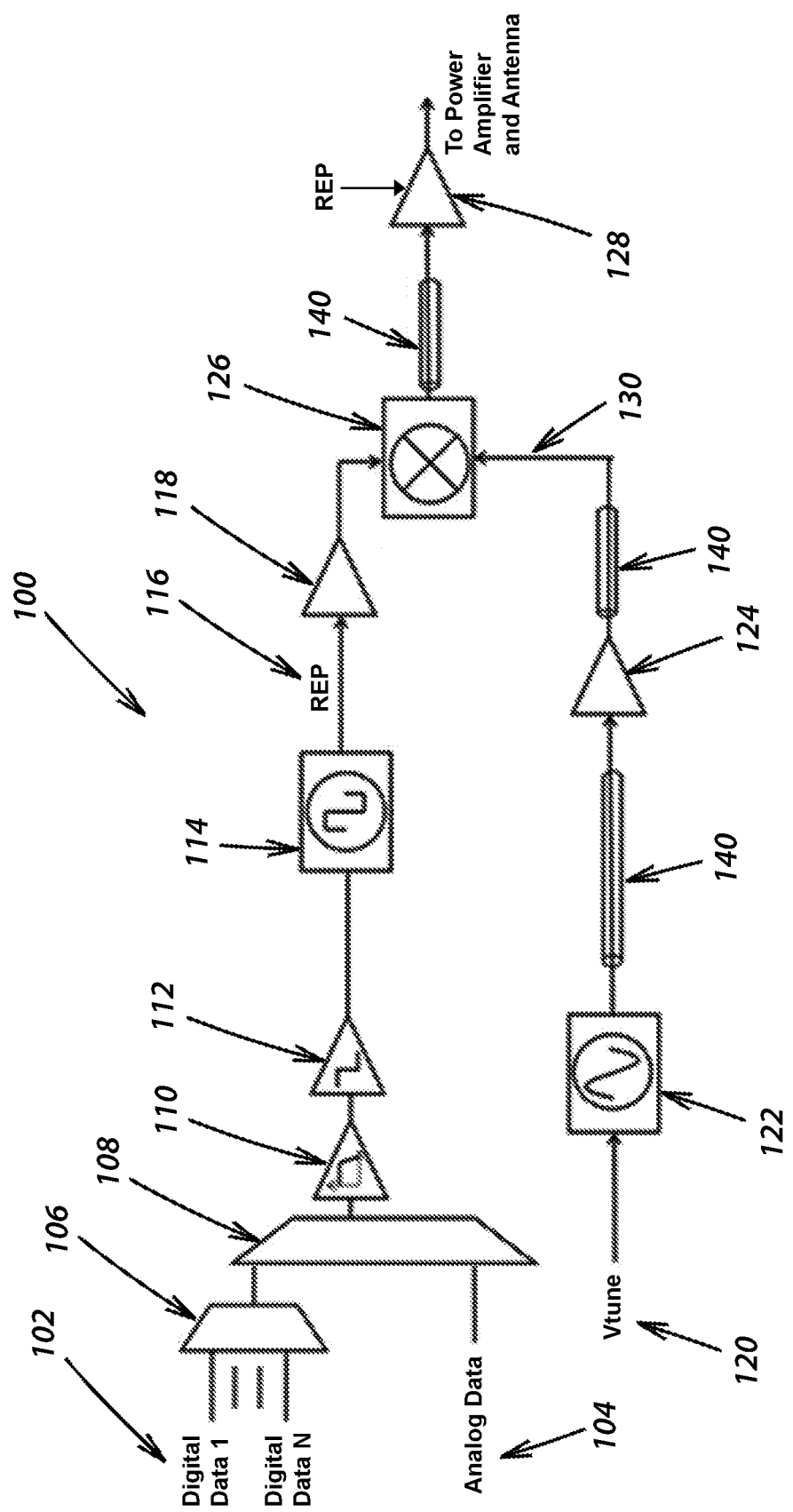
FIG. 9 depicts a detailed block diagram of a pulse based wideband signaling transmitter.

FIG. 9 shows a more detailed realization of a wideband transmitter 100. As shown herein, there are multiple digital data inputs 102 selected through a first multiplexer 106, and an analog input 104 selected along with the multiplexed digital data through a second multiplexer 108. However, it is within the scope of the invention to have a single digital or analog input and no multiplexer, or multiple analog inputs selected through a multiplexer, or both digital and analog data selected through a single multiplexer, or any combination thereof.

The throughput of the system, also known as the channel rate, is preferably about 1 Mb/s with the existing hardware. With faster hardware a higher channel rate could be realized. Thus the source data rate of the present invention is also preferably about 1 MBPS, which is fast enough to transmit video to a small screen on a mobile device such as a phone or tablet. If the system is being used with an embedded controller, the controller can be configured to control the data rate and thus optimize the operation of the system for specific applications.

The selected analog or digital signal is input to a low pass filter 110, and then to a bias and scaling circuit 112. The output of the bias and scaling circuit 112 serves as the control input to a VCO 114, whose output is the pulse repetition rate signal or PRR signal, also referred to as the REP 116. This portion of the transmitter signal chain, comprising the low pass filter 110, signal biasing and signal scaling circuit 112, and VCO 114, is also referred to as the data encoder. A key aspect of the present invention is that the PRR or REP 116 for both digital and analog data can be created with the same data encoder circuitry.

The REP 116 is then input to a differentiator or high pass filter 118 to sharpen the pulse edges, and then to a mixer 126. The mixer 126 is a VCO having two inputs, the REP 116 with sharpened pulse edges, and a carrier frequency 130. Vtune 120 is a tuning control signal input to a VCO 122 which provides high frequency pulses which are fed through an amplifier 124 whose output is the carrier frequency 130. All of the high frequency signals are preferably transmitted through 50 ohm transmission lines 140 in order to maintain signal fidelity and prevent signal loss. The mixer 126 output is a modulated signal which is then input to a pulse shaping amplifier 128. The pulse shaping amplifier 128 is powered by the REP 116, which thus gives the transmitter a high level of power efficiency since the pulse shaping amplifier 128 is only operating when the REP 116 is at a nonzero level.

The portion of the transmitter signal chain from the REP 116 as input, to the output of the pulse shaping amplifier 128, is also referred to as the wideband modulator.

The output of the pulse shaping amplifier 128 comprises high frequency wideband to ultra wideband pulses, which are sent through a power amplifier to the transmitter antenna to be transmitted as radio energy.

The signal chain for the transmitter may thus be seen as a data encoder, a wideband modulator, a power amplifier, and a transmitter antenna, transmitting a wideband pulsed radio signal.

The power amplifier is realized in multiple stages due to the very wideband nature of the WB/UWB RF signals considered. In order to provide adequate power amplification of the short pulses, the amplifier had to be realized in three distinct stages. These amplifiers need a high voltage to increase the amplification of the peak voltages required by the transmitter, which are not practical to achieve in a single stage. A quarter wave line s used to provide bias and power to the amplifiers, with the eventual output signal having a sufficiently high peak-to-peak voltage to achieve the required operational peak power from a low input power. This three-stage power amplifier is a preferred embodiment of a power amplifier for the present invention, however other power amplifier designs, including power amplifiers with fewer or more stages, and having different amplifying circuitry, are within the scope of the present invention.

Figure 10:
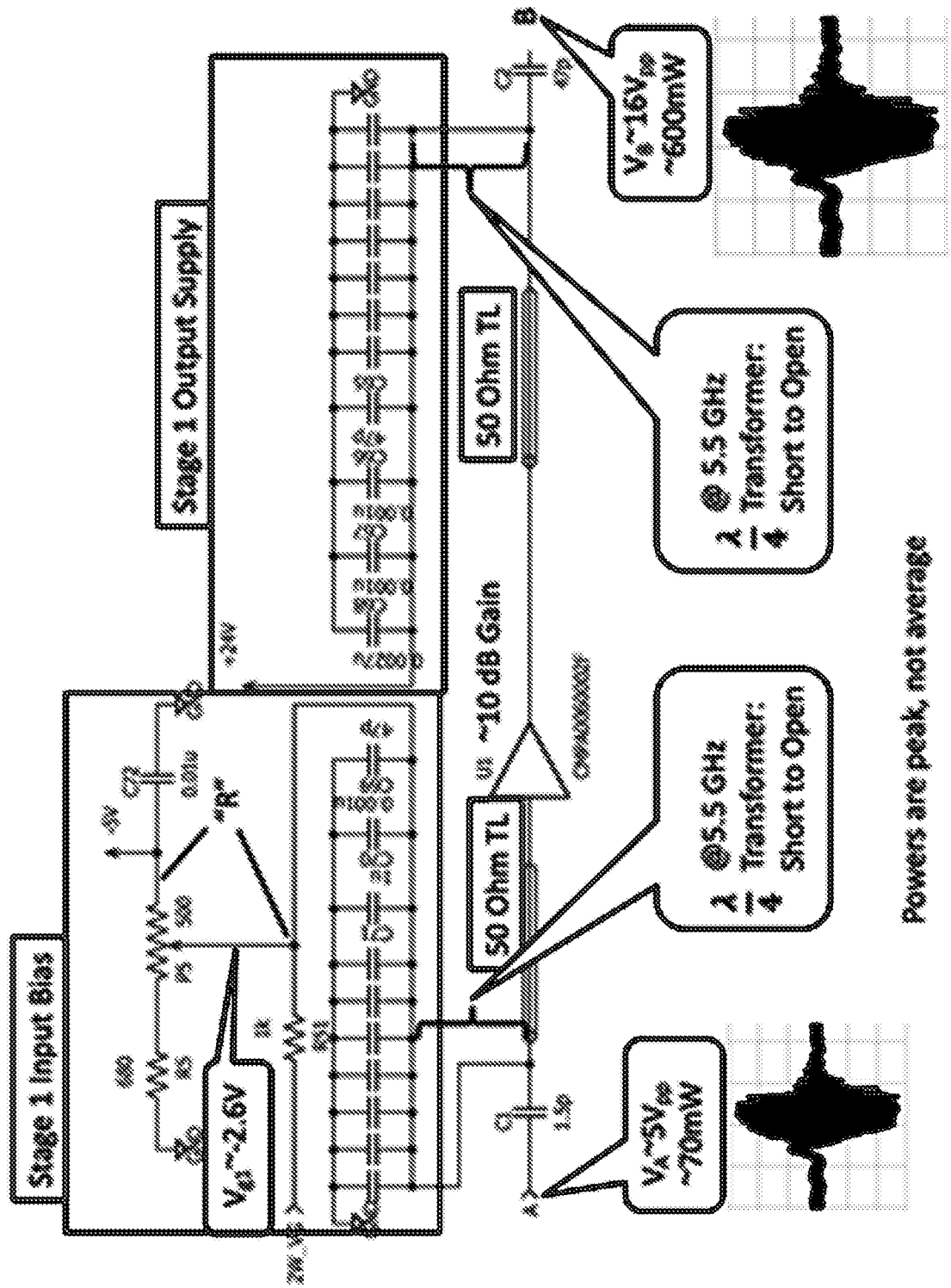
FIG. 10 depicts a first stage of a multistage high-power wideband pulse amplifier.

The first power amplifier stage is shown in FIG. 10. The input signal power is 70 mW, and the output signal power is 600 mW.

Figure 11:
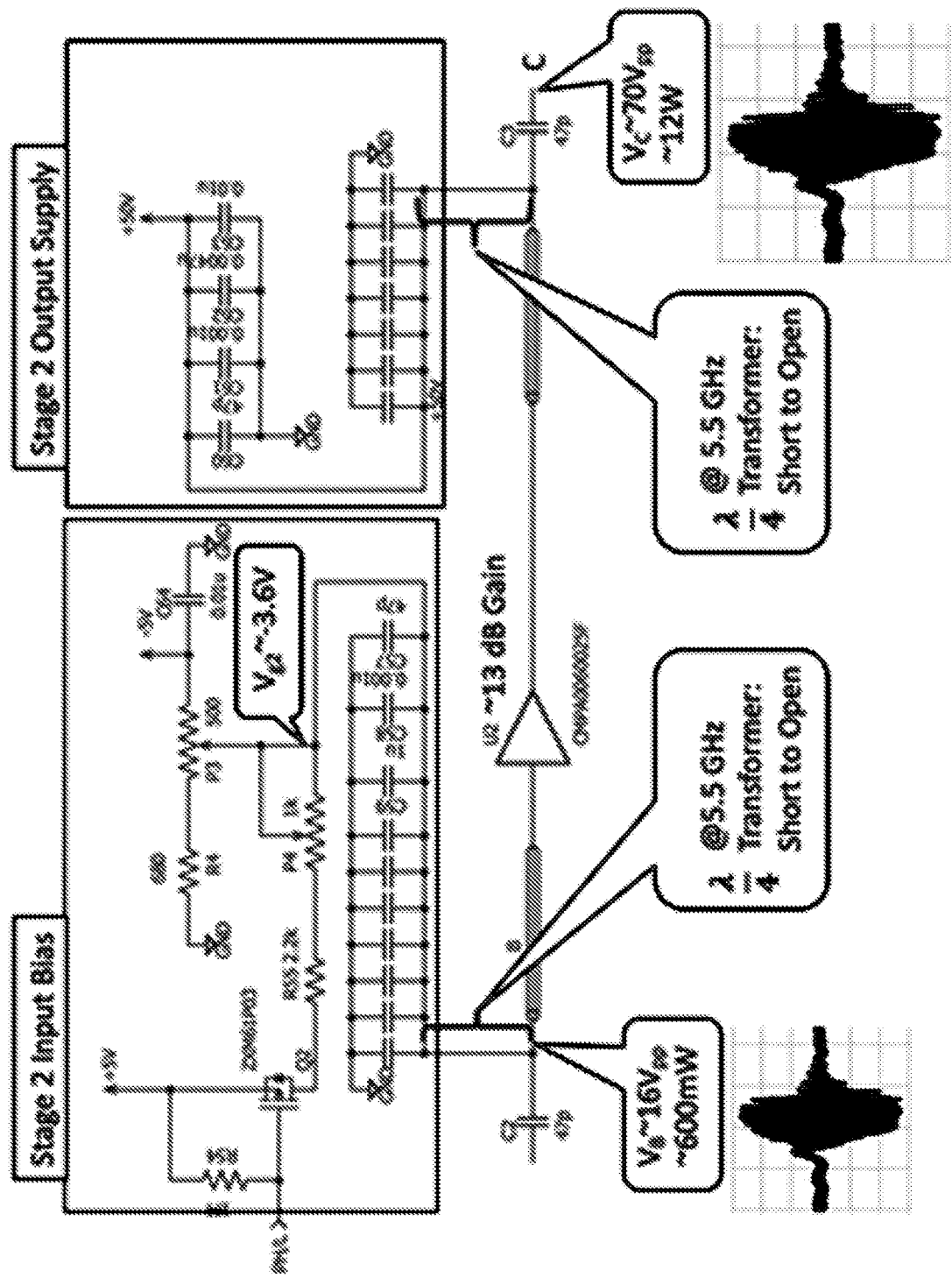
FIG. 11 depicts a second stage of a multistage high-power wideband pulse amplifier.

The second power amplifier stage is shown in FIG. 11. The input signal power is 600 mW, and the output signal power is 12 W.

Figure 12:
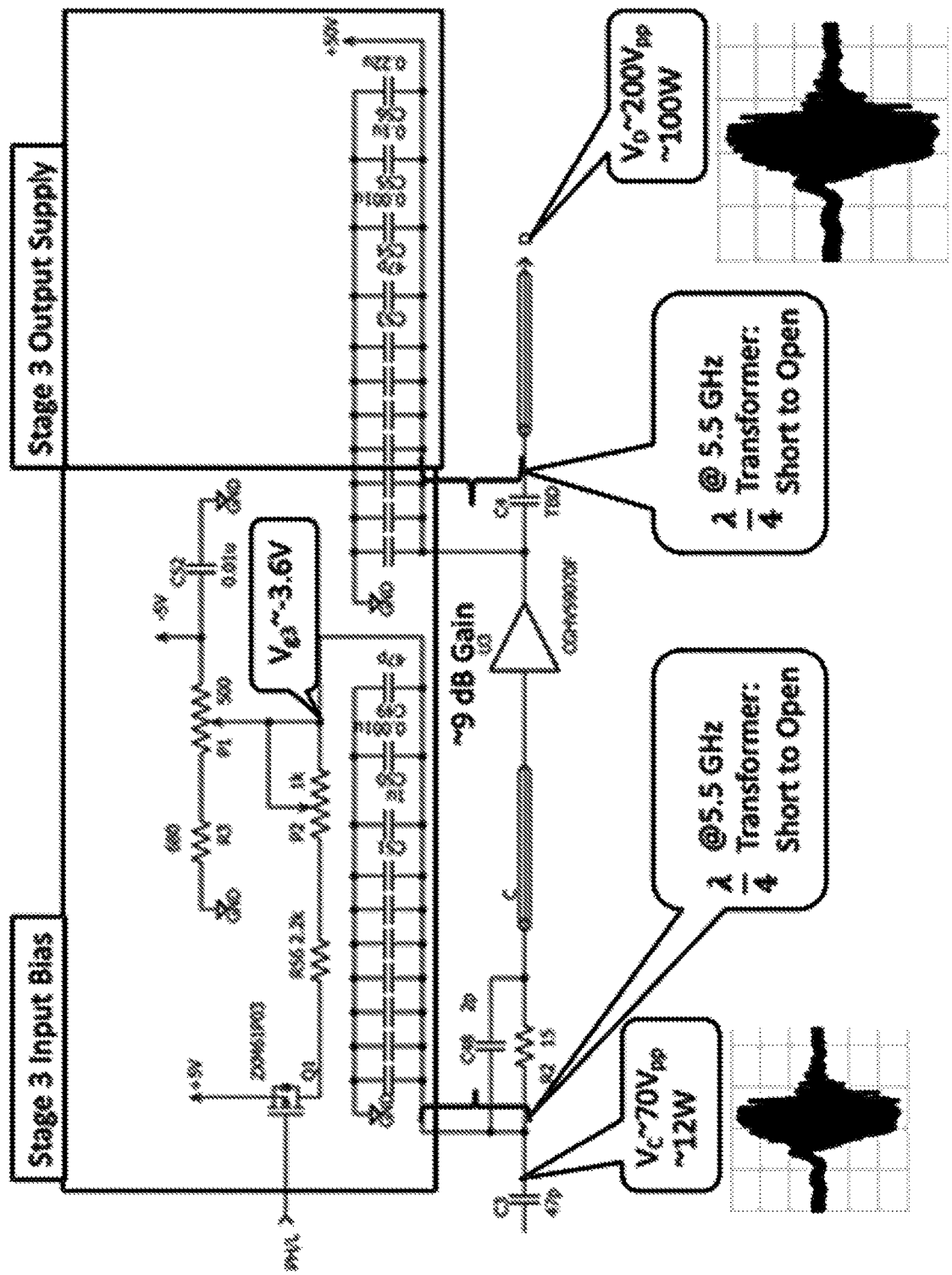
FIG. 12 depicts a third stage of a multistage high-power wideband pulse amplifier.

The first power amplifier stage is shown in FIG. 12. The input signal power is 12 W, and the output signal power is 100 W.

FIGS. 10-12 include reference to a 5.5 GHz center frequency, but the circuitry is equally valid for use with a 5.6 GHz center frequency.

Figure 13:
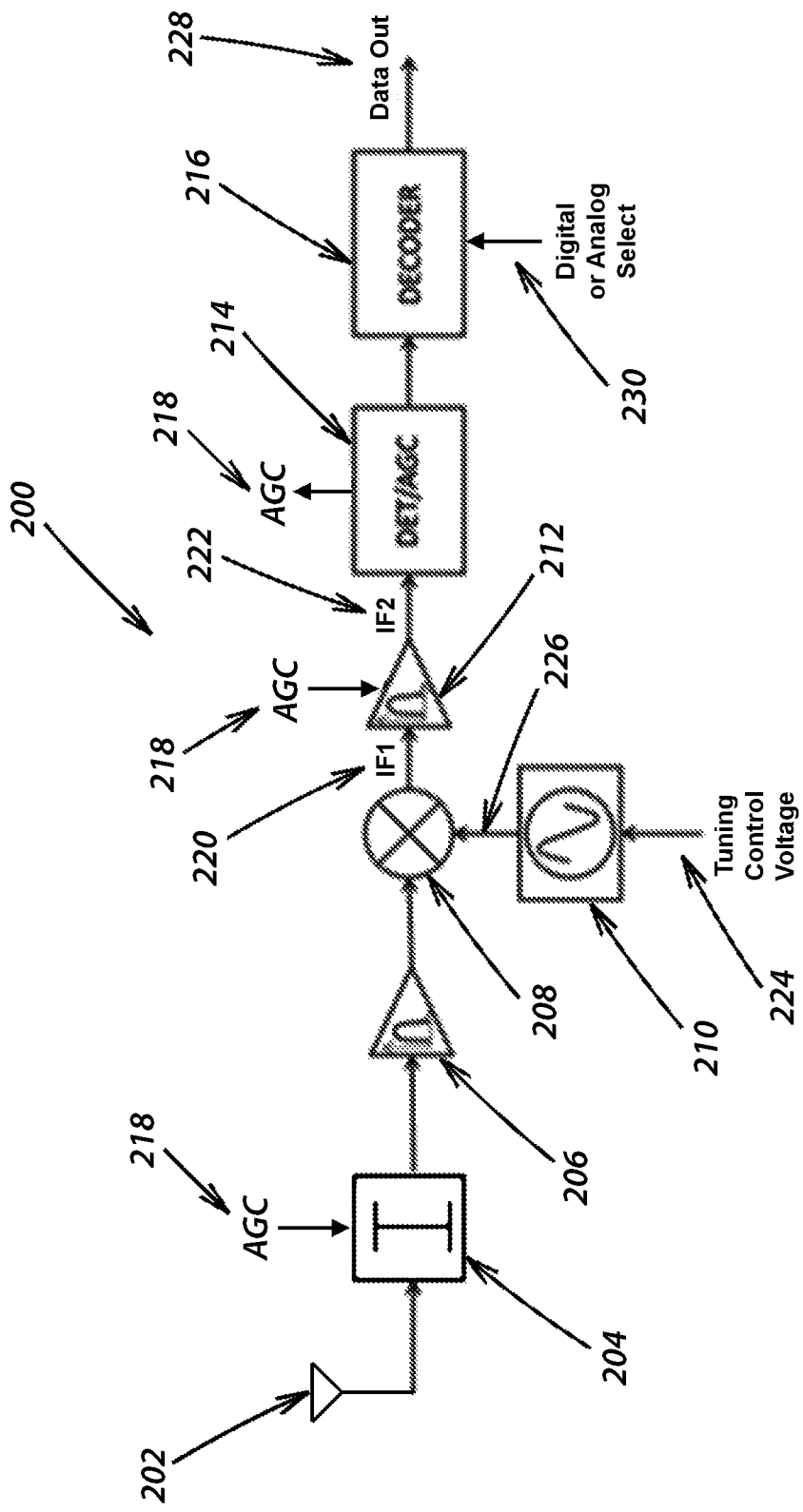
FIG. 13 depicts a detailed block diagram of a pulse based wideband signaling receiver.

FIG. 13 shows a more detailed realization of a wideband receiver 200. Wideband high-frequency radio signals are received by the receiver antenna 202 and input to an automatic gain control (AGC) circuit 204 for noise reduction and level adjustment. The AGC circuit 204 is controlled by an AGC control signal 218. The output of the AGC circuit 204 is input to a bandpass filter and low noise amplifier 206. The bandpass filter portion is preferably a pair of bandpass filters that each comprise cascading highpass and lowpass filters, thus providing a linear phase bandpass filter for wideband high-frequency signals. The output of the bandpass filter and low noise amplifier 206 is a wideband pulsed signal. The portion of the receiver 200 from the antenna 202 through the bandpass filter and low noise amplifier 206 represents the receiver 200 front end signal chain.

The wideband pulsed signal output of the bandpass filter and low noise amplifier 206 is a first input to a VCO and mixer 208. A tuner control voltage 224 is input to a VCO 210, producing a tuning frequency signal 226, which is the second input to the VCO and mixer 208. The output of the VCO and mixer 208 is IF1 220, a first intermediate frequency signal. IF1 220 is input to an intermediate frequency amplifier 212, which outputs a second intermediate frequency signal IF2 222. The intermediate frequency signals are still a wideband modulated sequence of pulses, but at a lower center frequency in order to take advantage of a greater range of hardware options for processing and demodulating the signal. The intermediate frequency amplifier 212 includes at least one bandpass filter and at least one low noise amplifier, preferably a sequence of multiple bandpass filters and low noise amplifiers, with the gain of the low noise amplifier being controlled by the AGC control signal 218 based on set high and low predefined thresholds. The portion of the receiver 200 from the VCO and mixer 208 through the intermediate frequency amplifier 212, and including the VCO 210, represents the receiver 200 intermediate frequency chain. The portion of the receiver from the AGC circuit 204 through the intermediate frequency amplifier 212 is also referred to as the baseband conversion stage.

IF2 222 is input to an RF detector 214, also known as the DET/AGC or the demodulator. The output of the RF detector 214 is the recovered PRR, demodulated from the wideband modulated sequence of pulses. The RF detector 214 is composed of a signal chain of at least one amplifier stage, a signal splitter with outputs of an RF detector output and the AGC control signal 218, with the RF detector output followed by a sample and hold circuit, a high pass filter, and at least one inverter. The AGC control signal 218 is used to control the noise level in the receiver 200 signal chain and sets the signal threshold, also known as the amplitude threshold level, to reduce any noise contribution. The inverter functions as a comparator to produce RF detector digital output data from a non-digital or noisy input. In the preferred embodiment two inverters are used in series to maintain the phase of the signal. The RF detector 214 amplifier is preferably a two-stage common emitter amplifier.

The demodulated output of the RF detector 214, also known as the recovered PRR, is input to a decoder block 216 containing a digital signal chain and an analog signal chain. The digital signal chain or analog signal chain are selected by the digital or analog select control line 230. Each of these signal chains comprises a a decoder. The digital signal chain comprises a digital decoder. The digital decoder comprises two coupled monostable multivibrators that function as bit slicers, followed by at least one lowpass filter and at least one inverter. The inverter functions as a comparator to produce RF detector digital output data from a non-digital or noisy input. In the preferred embodiment two inverters are used in series to maintain the phase of the signal. The analog decoder comprises two coupled monostable multivibrators that function as bit slicers, followed by at least one lowpass filter which interpolates the digital data to produce an analog data output. The bit slicers and lowpass filter may be the same for both the digital and analog signal paths, or may be different and optimized for digital and analog performance. The data output 228 from the receiver 200 may thus be either digital data or an analog signal, either preferably in the form of streaming data.

The signal chain for the receiver 200 may thus be seen as a receiver antenna 202, a baseband conversion stage, a demodulator 214, and a decoder.

Figure 14:
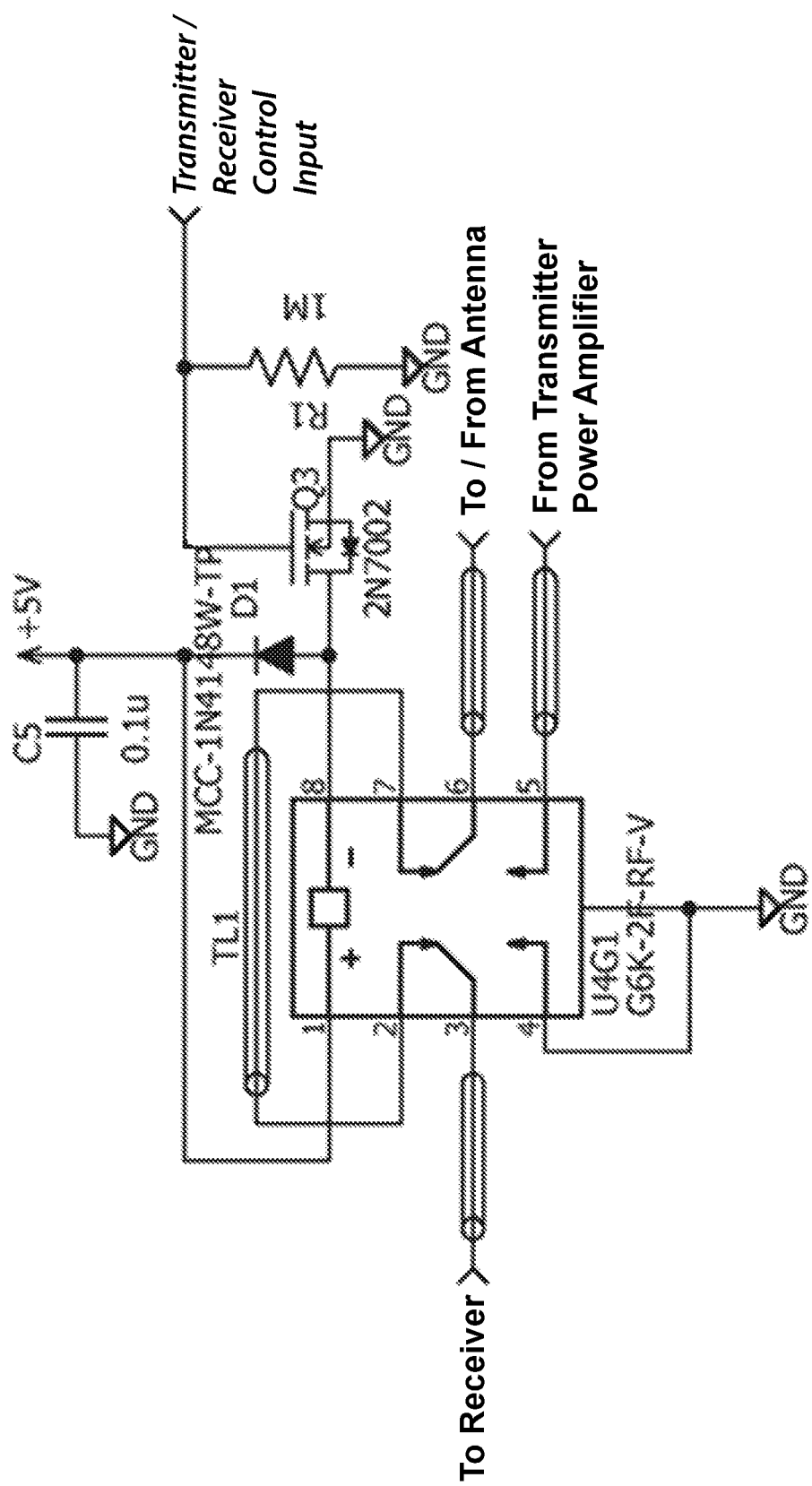
FIG. 14 depicts a switching circuit to permit a pulse based wideband signaling transmitter and a pulse based wideband signaling receiver to share a single antenna.

FIG. 14 shows a switching circuit for realizing half-duplex communication with the transmitter and receiver sharing a single antenna. A control input switches a relay to provide either a circuit path between the output of the transmitter power amplifier and the antenna, or between the antenna and the receiver input.

The PBWS modulation scheme provides resiliency against multipath and inter symbol interference by providing wide spectral coverage, plus time and frequency redundancy. Further, depending on the physical environment and bandwidth requirements, the PRF can be decreased for minimizing ISI. The use of increased coherent integration time can provide improved processing gain when in a multipath transmission environment, such as indoors or any other high-reflection environment. The PBWS processes data in terms of frequency, so the time effects of pulse spreading do not affect signal quality. The PBWS transmission range can be from a few meters to hundreds of meters. This is a much longer range than current UWB systems.

The flexibility of this invention allows it to be optimized anywhere along the variables of bandwidth (bit rate), signal to noise ratio, range, and power. The PBWS system and modulation method can work at any frequency, including high millimeter waves, 76 GHz, (a preferred frequency for vehicle to vehicle communication) and even terahertz frequencies, once the hardware for terahertz communication becomes practical. This method of modulation is only limited by existing hardware, and will work with faster hardware when it becomes available.

Any antenna suitable for a wideband and preferably handheld device will work with the PBWS system. A multiple-input, multiple-output (MIMO) antenna is not required for the PBWS system, but adding a MIMO antenna and SDR functionality to the PBWS system will make it an even higher performance system, additionally including the optional capability of hardware based or physical layer encryption. In particular, a MIMO antenna and interface causes the performance of the system to be excellent in urban environments, due to improved deconvolution of multipath reflections.

However even without a MIMO antenna, the PBWS system performance is excellent in cluttered environments such as prisons, tunnels, and urban environments, i.e. having many concrete walls. Another use for the PBWS system is in wideband coded radar.

If the system includes an H matrix of multiple antennas, then it effectively incorporates a code in the geometry of the antennas. This becomes an additional "fingerprint" or encryption signature that would work with a MIMO interface.

Having described herein illustrative embodiments and best mode of the present invention, persons of ordinary skill in the art will appreciate various other features and advantages of the invention apart from those specifically described above. It should therefore be understood that the foregoing is only illustrative of the principles of the invention, and that various modifications and additions can be made by those skilled in the art without departing from the spirit and scope of the invention. Accordingly, the appended claims shall not be limited by the particular features that have been shown and described, but shall be construed also to cover any obvious modifications and equivalents thereof.

What is claimed is:

1. A system for pulse based wideband signaling comprising:
at least one wideband transmitter for transmitting wideband radio frequency pulses;
the transmitter having a data input;
wherein the transmitter comprises a signal chain of a data encoder, a wideband modulator, a power amplifier, and a first antenna;
the data encoder having a set of specific pulse sequences that are used for encoding data, wherein the data input is encoded as a pulse repetition rate signal to be used in a wideband radio frequency sequence of modulated pulses;
the wideband modulator having a specific carrier frequency and bandwidth, and producing a wideband modulated sequence of pulses in response to the pulse repetition rate signal;
the wideband modulated sequence of pulses comprising a plurality of chips, wherein each chip is an individual modulated pulse, and wherein each "0" bit of data comprises a first plurality of chips having a first sequence of chip durations and spacings, and each "1" bit of data comprises a second plurality of chips having a second sequence of chip durations and spacings;
whereby the transmitter outputs a wideband pulsed radio signal through the power amplifier and the first antenna;
at least one wideband receiver for receiving data;
wherein the receiver comprises a signal chain of a second antenna, a baseband conversion stage, a demodulator, and a decoder;
the second antenna receiving the wideband pulsed radio signal;
the baseband conversion stage converting the wideband pulsed radio signal to an intermediate frequency pulsed signal;
wherein the demodulator comprises;
a signal chain of at least one amplifier stage, a signal splitter with outputs of a radio frequency detector output and an automatic gain control signal, the radio frequency detector output followed by a sample and hold circuit, a high pass filter, and at least a first inverter;
wherein the first inverter functions as a comparator to produce digital output data from a non-digital or noisy input;
the demodulator extracting the pulse repetition rate signal from the intermediate frequency pulsed signal;
the decoder producing a receiver data output in bits from the input of the pulse repetition rate signal, and
wherein the at least one wideband receiver is configured to correctly decode the pulse repetition rate signal in order to decode data.

2. The system according to claim 1, wherein the data input is either digital data or analog data.

3. The system according to claim 2, wherein
the transmitter further comprises at least one multiplexer for accepting both analog and digital data inputs;
the demodulator is a digital demodulator and an analog demodulator;
the decoder is a digital decoder and an analog decoder; and
the at least one wideband receiver includes a switching circuit for selecting either the digital demodulator and digital decoder, or the analog demodulator and the analog decoder.

4. The system according to claim 3, wherein the digital decoder comprises: two coupled monostable multivibrators having the demodulator output as input and functioning as bit slicers, at least one lowpass filter at least a second in and wherein the second inverter functions as a comparator to produce a receiver digital data output from the noisy input.

5. The system according to claim 3, wherein
the analog decoder comprises:
two coupled monostable multivibrators having the demodulator output data as input and functioning as bit slicers, and at least one lowpass filter; and
wherein the lowpass filter interpolates the digital data to produce a receiver analog data output.

6. The system according to claim 2, wherein
an analog form of the pulse repetition rate signal comprises:
a sequence of wideband pulses generated in response to an input signal of time-varying amplitude;
wherein each wideband pulse is a pulse that has been modulated with a radio frequency signal to contain a plurality of spectral components;
a variable time spacing between each pulse in the sequence of wideband pulses; and
the variable time spacing between each pulse being a function of the amplitude of the input signal.

7. The system according to claim 2, wherein
a plurality of start bits sent from the at least one wideband transmitter comprises a code instructing the at least one wideband receiver as to whether the incoming data is analog data or digital data.

8. The system according to claim 1, wherein the data encoder comprises: a first voltage controlled oscillator, wherein the data input provides a control voltage and thereby determines a frequency output from the first voltage controlled oscillator; the frequency output is the pulse repetition rate signal; and the pulse repetition rate signal is in the format of "0" outputs and "1" outputs.

9. The system according to claim 8, wherein
the data encoder further comprises signal processing elements providing input to the first voltage controlled oscillator, the signal processing elements including at least one of low pass filters, signal biasing, and signal scaling.

10. The system according to claim 1, wherein
the wideband modulator comprises:
a differentiator or high pass filter to sharpen pulse edges;
a second voltage controlled oscillator functioning as a first mixer and having as inputs the pulse repetition rate signal and a carrier frequency;
a pulse shaping amplifier, wherein the first mixer output is the pulse shaping amplifier input;
the pulse shaping amplifier being powered by the pulse repetition rate signal, thereby providing a high level of power efficiency to the transmitter; and
the pulse shaping amplifier having an output comprising high frequency wideband to ultra wideband pulses.

11. The system according to claim 1, wherein
the baseband conversion stage comprises:
a receiver front end signal chain comprising a first automatic gain control circuit controlled by an automatic gain control signal, at least one bandpass filter, and at least one low noise amplifier, providing an output of a wideband pulsed signal;
a receiver intermediate frequency signal chain comprising:
a third voltage controlled oscillator accepting as input a tuning control voltage and producing a tuning frequency signal;
a second mixer accepting as inputs the tuning frequency signal and the wideband pulsed signal, and providing as output a first intermediate frequency signal;
an intermediate frequency amplifier accepting as input the first intermediate frequency signal and providing a second intermediate frequency signal;
the intermediate frequency amplifier comprising:
at least one bandpass filter and at least one low noise amplifier; and
wherein the gain of the low noise amplifier in the intermediate frequency amplifier is controlled by the AGC control signal.

12. The system according to claim 11, wherein
the bandpass filter in the receiver front end signal chain comprises a pair of bandpass filters that each comprise cascading highpass and lowpass filters, thus providing a linear phase bandpass filter for wideband high-frequency signals.

13. The system according to claim 11, wherein
the second intermediate frequency is adjusted by the AGC control signal based on set high and low predefined automatic gain control thresholds.

14. The system according to claim 1, wherein
the system is asynchronous and requires no phase locked loop, thereby permitting operation with lower power consumption than a system with a phase locked loop would require.

15. The system according to claim 1, wherein
the system further comprises at least one start bit and at least one stop bit for data transmitting and data receiving.

16. The system according to claim 1, wherein
the system comprises a plurality of transmitters and receivers, thereby permitting the simultaneous transmission of multiple sequences of data.

17. The system according to claim 1, wherein
the at least one wideband transmitter and the at least one wideband receiver include a narrowband frequency range.

18. The system according to claim 1, wherein
the at least one wideband transmitter and the at least one wideband receiver include an ultrawideband frequency range.

19. The system according to claim 1, wherein
the pulse sequences each comprise at least one pulse having a pulse shape; and
the data input is encoded by modulation of the pulse shape.

20. The system according to claim 1, wherein
the data input is encoded as a pulse repetition frequency signal.

21. The system according to claim 1, wherein
the data input is encoded as a pulse polarity signal.

22. The system according to claim 1, wherein
the pulse sequences each comprise a plurality of pulses and at least one delay time between the pulses; and
the data input is encoded by the delay times between the pulses.

23. The system according to claim 1, wherein
the at least one wideband transmitter further comprises at least one of a circuit capable of performing hardware based encryption and a first processor capable of performing software based encryption;
the at least one wideband receiver further comprises at least one of a circuit capable of performing hardware based decryption and a second processor capable of performing software based decryption; and
wherein at least one of hardware-based encryption and software based encryption is performed upon the transmitted data, and at least one of hardware-based decryption and software-based decryption is performed upon the demodulated and decoded data.

24. The system according to claim 1, wherein
the first and second plurality of chips per bit of data are each in the range of 4 to 5.

25. The system according to claim 1, wherein
the first and second plurality of chips per bit of data have orthogonal patterns, thereby maximizing signal to noise ratio.

26. The system according to claim 1, wherein
the at least one wideband transmitter and the at least one wideband receiver are connected to a single antenna through a switching circuit, thereby enabling half duplex communication.

27. The system according to claim 1, wherein
the at least one wideband transmitter further comprises a transmitter bandwidth control circuit providing control over the quantity of chips in the plurality of chips per bit of data;

the at least one wideband receiver further comprises a receiver bandwidth control circuit providing control over detecting the quantity of chips in the plurality of chips per bit of data;

the quantity of chips in the plurality of chips per bit of data creating a relationship between the data bandwidth and the signal to noise ratio;

the transmitter bandwidth control circuit and the receiver bandwidth control circuit being operated with identical chips per bit of data settings; and thereby controlling the data bandwidth versus signal to noise ratio.

28. The system according to claim 1, wherein the power amplifier has multiple amplification stages, thereby achieving a wideband/ultrawideband peak power of approximately 100 Watts at 5.6 GHz.

* * * * *